US011986851B2

(12) United States Patent
Phillips

(10) Patent No.: US 11,986,851 B2
(45) Date of Patent: May 21, 2024

(54) PHILLIPS SMART EDGE

(71) Applicant: Howard Marcellus Phillips, Los Angeles, CA (US)

(72) Inventor: Howard Marcellus Phillips, Los Angeles, CA (US)

(73) Assignee: Howard Marcellus Phillips, Los Angeles, CA (US)

( * ) Notice: Subject to any disclaimer, the term of this patent is extended or adjusted under 35 U.S.C. 154(b) by 0 days.

(21) Appl. No.: 17/321,503

(22) Filed: May 17, 2021

(65) Prior Publication Data

US 2022/0362801 A1 Nov. 17, 2022

(51) Int. Cl.
*B05C 17/02* (2006.01)

(52) U.S. Cl.
CPC ...... *B05C 17/0212* (2013.01); *B05C 17/0205* (2013.01)

(58) Field of Classification Search
CPC ........................ B05C 17/0205; B05C 17/0212
See application file for complete search history.

(56) References Cited

U.S. PATENT DOCUMENTS

2009/0133207 A1* 5/2009 Dale .................. B05C 17/0217 15/230.11
2017/0151583 A1* 6/2017 Walsh .................. A46B 5/0012
2018/0001337 A1* 1/2018 Phillips .................. B05C 17/00
2018/0281297 A1* 10/2018 Pringle, IV ........... B05C 1/0813
2019/0184421 A1* 6/2019 Phillips ................. B29C 63/105
2020/0238599 A1* 7/2020 Sekar .................... B29C 63/105

* cited by examiner

*Primary Examiner* — Karl Kurple
(74) *Attorney, Agent, or Firm* — Howard Marcellus Phillips

(57) ABSTRACT

The Phillips Smart Edge is a paint application tool with guide means, made of synthetic material and is used for painting in any standard room corner for edging and trimming. The Phillips Smart Edge is used in corners of walls and intersecting surfaces. Projecting outward from parallel (FIG. 2) depending bars, Metal Bars receive the ends of the roller. Preferably the application surface of the roller is arched or triangular in shape. Standard walls which converge toward each other will be able to be coated with this device. The paint is applied to the surface rapidly and efficiently with the Phillips Smart Edge.

6 Claims, 1 Drawing Sheet

PHILLIPS SMART EDGE

BACKGROUND OF THE INVENTION

Field of the Invention

The Phillips Smart Edge relates to paint application tools and more particularly to an improved device for paint application. When painting surfaces which intersect it is desirable to utilize an application tool to paint. The painting applicator has a roller that is arched in the middle to reach cornered walls and apply paint thoroughly.

Description of Related Art

Pertinent prior art patents which show instruments are the patents to Frederick B. Burns U.S. Pat. No. 36,005,165 A; to Gregg Moore Charles U.S. Pat. No. 3,359,589 A. and to Frederick Wood Jr. U.S. Pat. No. 2,810,148 A. The applicator shown in Burns U.S. Pat. No. 3,605,165 A is a paint applicator with guide means for painting a surface which abuts an intersecting surface, characterized in that the guide means, preferably in the form of rollers, project outwardly beyond opposite sides of the applicator and lie on either side of the handle. Preferably, the applicating surface is trapezoidal with the rollers overhanging nonparallel edges which converge toward each other. The applicator shown in Charles U53359589 A relates generally to a painting device and more particularly to a device which is adapted to apply paint uniformly to a surface in a straight-line adjacent edge formed as by the intersection of two walls or a wall and a ceiling or floor, such device having particular utility in applying paint to a corner area formed as by the intersection of two walls and the ceiling or floor.

The applicator shown in Wood U.S. Pat. No. 2,810,148 A comprises a carriage in the form of a flat rectangular frame plate from the rear side of which a handle 11 extends outwardly. The handle 11 is preferably of rectangular shape and is arranged centrally and toward the bottom of the plate 10 as shown. In use the operator of the device would grasp the opposite vertical sides of the handle 11 between his fingers. These vertical sides may be serrated if desired to provide a better hold.

All of these prior art devices are suitable for intended only for use in trim work and not for general paint application. Thus, a user might switch between applicators for general application and another applicator for trim work.

BRIEF SUMMARY OF THE INVENTION

The Phillips Smart Edge is a painting edge application tool. A handle (FIG. 3) secured to another part bars (metal bars in FIG. 2) that are connected to roller (FIG. 1). The roller is arched and in position to apply any paint and thus being placed on an area of a cornered wall or surface. This invention is directed, in brief, to the general purpose painting tool. The best mode currently contemplated for carrying out the invention is painting any cornered wall or surface. A great advantage for its use is that it alleviates two apparatuses during edging or trimming a wall. The idea is to be able to hold one apparatus in one hand while completing a specific edging task.

BRIEF DESCRIPTION OF VIEW(S) OF THE DRAWING

DETAILED DESCRIPTION OF THE INVENTION

Figure 1:
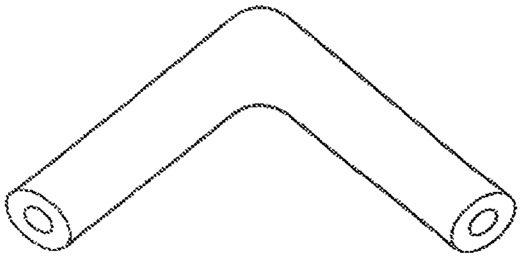
FIG. 1 is a section view taken generally along the lines of FIG. 1.
Figure 2:
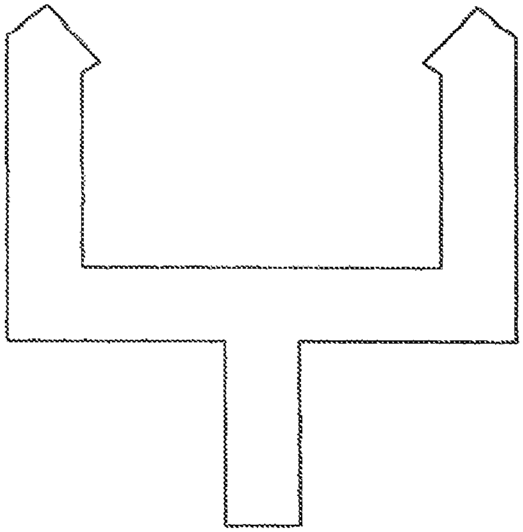
FIG. 2 is a section view taken generally along the lines of FIG. 2.

The Phillips Smart Edge is a Paint Application Tool made of synthetic material and is used for painting in any standard cornered wall or area, in edging or trim work in any room's corner. The paint is applied to surface rapidly and efficiently. It alleviates having to use two apparatuses. It is new and its idea is to save time. The Phillips Smart Edge consists of: (FIG. 1) Roller at ⅜ in. diameter and at 7 in. in length and arched in the middle to place paint in any cornered wall or surface. The roller absorbs paint and transfers paint to the cornered wall or surface. (FIG. 2) Metal Bars that lead 2 in. downward and at the top of 2 in. Metal Bars each side tilts inward to roller on both sides. At the bottom of (FIG. 2) Metal Bars at 2 in. lead inward (lateral). The bottom plastic handle (FIG. 3) 6 in. in length is used for gripping with either hand to apply paint. Parts of "roller frame" one part metal and (b) one part plastic. "And a roller cover" (cotton or synthetic). The roller cover absorbs the paint and transfer it to the surface, the roller frame (FIG. 2 & (FIG. 3) attaches to the roller cover and can be held with either hand in use. The roller (FIG. 1) is manufactured the very easy to use and anyone that has pertinent skills in the background of the invention will be able to use the Phillips Smart Edge with ease. By placing the roller (FIG. 1) between the metal bars (FIG. 2) part of the handle (FIG. 2) (FIG. 3) Plastic Handle fits in place to hold as it combines with metal bars (FIG. 2). The Plastic Handle (FIG. 3) is for gripping with either hand as you use rapid and efficient motions in any cornered wall or surface as the user does and completes any project. To apply paint to roller you simply converge roller into any paint tray (with tray being filled with paint) and roll roller (FIG. 1 several times back and forth in smooth motion to saturate roller and lift and apply paint to any cornered wall or surface. For continued use of the Phillips Smart Edge repeat the steps from above.

The Phillips Smart Edge is only to be used in the edging or trim work of painting. The word "industry" is a corresponding word that goes with the Technical Field in my invention ("Construction Industry") Sub-Field "Painting".

Description of the First Embodiment

Figure 3:
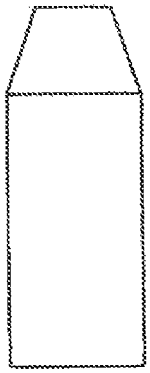
FIG. 3 is a section view taken generally along the lines of FIG. 3.

The applicator of this invention includes a handle. The applicator of this invention (FIG. 1) is connected to (FIG. 2) Metal Bars and then connected to a handle (FIG. 3). The applicator itself is arched in the middle and made of material for absorbing paint. The embodiment of the applicator enables a user to have productivity in their work because of the divisional characteristics of the invention in the arch in the middle.

Applicator is arched in the middle, it leads downward at angle on each side (FIG. 2). Metal Bars (FIG. 2) lead upward and then inward (lateral) and then downward again are one part of two for overall handle (FIG. 2) & (FIG. 3), (FIG. 3) Plastic Handle combines with metal bars (FIG. 2) for overall (both parts) Handle (FIG. 2) & {FIG. 3). In use when the applicator is used to apply paint it will make an adjustment by moving the roller. The roller having already being measured for any standard wall or surface With this invention shown in the drawings and will herein be described in detail, a specific embodiment thereof, with the understanding that the present disclosure is to be considered as an exemplication of the principles of the invention and is not intended to limit the invention to the embodiment illustrated.

Specification

The Phillips Smart Edge in (FIG. 1) is a roller that absorbs paint and transfers paint to any cornered wall or surface. Roller is at ⅜ in, in diameter and 7 in. in length, arched in the middle and 7 in, in entire length. Metal bars in FIG. 2 connect on sides of roller for movement of roller against any surface for edging and trimming. Metal Bars at the top of 2 in., where ¼ in. of each side tilts inward to roller on each side At the bottom, the metal bars then across at 7½ in, in entire length Plastic Handle at 6 in. in length that can be held with either hand to apply paint to surface and extends downward from a point in the middle of the length extending between the metal bars.

Brief Summary of Specifications

The Phillips Smart Edge in (FIG. 1) is a roller that absorbs paint and transfer it to any cornered wall or surface. Roller is at ⅜ in, in diameter and 7 in, in length, arched in the middle and 7 in, in entire length. Metal bars in (FIG. 2) connect on sides of roller for movement of roller against any surface for edging and trimming. Metal Bars on each side tilts inward to roller ) and then downward at bottom of (FIG. 2) Metal Bars. Plastic Handle at 6 in in length that connect to overall handle (bars in FIG. 2) and can be held with either hand to apply paint to surface.

Specifications, Phillips Smart Edge (FIG. 1) ⅜ in. in Dm and 7 in. L (FIG. 2) 2 in. HT×7½ in. Wid×5 in. HT (FIG. 3) 6 in. L Technical Specifications, The Phillips Smart Edge in (FIG. 1) is a roller that absorbs paint and transfer it to any cornered wall or surface, Roller is at ⅜ in. in diameter and 7 in. in length, arched in the middle, and 7 in. in entire length. Metal bars in (FIG. 2) connect on sides of roller for movement of roller against any surface for edging and trimming. Metal Bars ¼ in. of each side tilts inward to roller and then downward at bottom then the metal bars lead inward (lateral) and meet in the middle. A plastic handle at 6 in. in length that can be held with either hand to apply paint to a surface is attached to the metal bars in the middle of the lateral portion of the metal bars.

What I claim as my invention is:

1. A painting edge tool used for edging and trimming comprising:

a roller that is configured to transfer paint to a cornered wall or the surface, wherein said roller having a length extending between a first end and a second end; and said roller is arched in the middle;

a roller mount assembly comprising:

a cross bar extending in a length direction, two depending bars, and a handle connector;

wherein said two depending bars extend from respective ends of the crossbar in a direction perpendicular to the length direction of the cross bar with an axis of symmetry extending in the direction perpendicular to the length direction of the cross bar and located between the two depending bars;

a first depending bar having a first end portion located at an end of the first depending bar, said first end portion tilts upwardly at a non-perpendicular and a non-parallel angle relative to the cross bar and a second depending bar having a second end portion located at an end of the second depending bar, said second end portion tilts upwardly at a non-perpendicular and non-parallel angle relative to the cross bar such that the roller can be mounted between the first end portion and the second end portion of the two depending bars;

wherein said first end portion and second end portion are each configured to connect the first end and the second end of the roller, respectively, and allow movement of the roller for paint application to the cornered wall or the surface; wherein said first end portion having a upper side and lower side which are parallel to each other, and said second end portion having a upper side and lower side which are parallel to each other, wherein said handle connector extends from a middle of the crossbar in a direction opposite of the two depending bars and into a plastic handle which can be held by a user.

2. The painting edge tool as claimed in claim 1 wherein said roller having a roller cover made of cotton.

3. The painting edge tool as claimed in claim 1 wherein said roller is about ⅜ in. in diameter and about 7 in in length between the first end and the second end.

4. The painting edge tool as claimed in claim 1 wherein said depending bars are made of metal.

5. The painting edge tool as claimed in claim 1 wherein said roller is made of synthetic material.

6. The painting edge tool as claimed in claim 1 wherein said roller having a roller cover made of synthetic material.

* * * * *